United States Patent
Huang et al.

(10) Patent No.: US 11,664,960 B2
(45) Date of Patent: May 30, 2023

(54) FULL-DUPLEX SLOT CONFIGURATION

(71) Applicant: QUALCOMM Incorporated, San Diego, CA (US)

(72) Inventors: Min Huang, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 16/926,193

(22) Filed: Jul. 10, 2020

(65) Prior Publication Data

US 2021/0028916 A1  Jan. 28, 2021

(51) Int. Cl.
*H04W 72/04* (2023.01)
*H04L 5/14* (2006.01)
*H04W 72/0446* (2023.01)
*H04L 5/00* (2006.01)

(52) U.S. Cl.
CPC ............ *H04L 5/14* (2013.01); *H04L 5/003* (2013.01); *H04L 5/0005* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2015/0173014 A1* | 6/2015 | Lee | H04W 74/006 370/311 |
| 2018/0270884 A1* | 9/2018 | Fraser | H04W 74/04 |
| 2019/0268938 A1* | 8/2019 | Zhao | H04L 5/0048 |
| 2019/0327757 A1* | 10/2019 | Oteri | H04L 5/0053 |
| 2020/0007302 A1* | 1/2020 | Manolakos | H04L 5/023 |
| 2020/0374807 A1* | 11/2020 | Zhang | H04W 72/0493 |
| 2021/0067992 A1* | 3/2021 | Kusashima | H04W 24/08 |

(Continued)

FOREIGN PATENT DOCUMENTS

| | | |
|---|---|---|
| WO | 2019011259 A1 | 1/2019 |
| WO | 2019013884 A1 | 1/2019 |

OTHER PUBLICATIONS

Ericsson: "Duplexing in IAB", 3GPP Draft; R2-1801024—Duplexing in IAB, 3rd Generation Partnership Project (3GPP), Mobile Competence Centre; 650, Route Des Lucioles; F-06921 Sophia-Antipolis Cedex; France, vol. RAN WG2, No. Vancouver, Canada; Jan. 22, 2018-Jan. 26, 2018, Jan. 12, 2018 (Jan. 12, 2018), pp. 1-6, XP051386524, Retrieved from the Internet: URL: https://www.3gpp.org/ftp/tsg_ran/WG2_RL2/TSGR2_AHs/2018_01_NR/Docs/ [retrieved on Jan. 12, 2018].

(Continued)

*Primary Examiner* — Brandon M Renner
(74) *Attorney, Agent, or Firm* — Patterson + Sheridan, LLP

(57) ABSTRACT

Certain aspects of the present disclosure provide techniques for full-duplex slot configuration. A method that may be performed by a wireless node includes determining one or more traffic parameters associated with data configured for communication via wireless links including at least one reception link and at least one transmission link, selecting a full-duplex (FD) slot type for communication of the data via the wireless links, wherein the FD slot type is based on the one or more traffic parameters, and communicating the data with one or more wireless nodes via the wireless links in accordance with the selected FD slot type.

29 Claims, 10 Drawing Sheets

| Link \ Slot type index | 1 | 2 | 3 | 4 | 5 | 6 | 7 | 8 | 9 |
|---|---|---|---|---|---|---|---|---|---|
| DL Parent BH | Rx | Rx | Rx | | | | | | |
| UL Parent BH | Tx | | | Tx | Tx | | | | |
| DL Child BH | | Tx | | | | Tx | Tx | | |
| UL Child BH | | | | Rx | | Rx | | Rx | |
| DL Access | | | Tx | | | | | Tx | Tx |
| UL Access | | | | | Rx | | Rx | | Rx |

(56) References Cited

U.S. PATENT DOCUMENTS

| | | | | |
|---|---|---|---|---|
| 2021/0083943 | A1* | 3/2021 | Chen | H04L 47/76 |
| 2021/0184788 | A1* | 6/2021 | Lu | H04W 24/02 |
| 2021/0258889 | A1* | 8/2021 | Zhang | H04W 52/247 |
| 2021/0399789 | A1* | 12/2021 | Koskinen | H04W 40/248 |
| 2022/0060246 | A1* | 2/2022 | Tiirola | H04W 40/22 |
| 2022/0078788 | A1* | 3/2022 | Tiirola | H04W 72/0446 |
| 2022/0191800 | A1* | 6/2022 | Huang | H04W 52/243 |

OTHER PUBLICATIONS

International Search Report and Written Opinion—PCT/CN2019/097033—ISA/EPO—dated Apr. 23, 2020.

Nokia, et al., "Dynamic Resource Allocation Between Backhaul and Access Links", 3GPP TSG RAN WG1 Meeting #92bis, R1-1804622, Apr. 20, 2018 (Apr. 20, 2018), 7 Pages, Section 2.

Nokia, et al., "Resource Allocation/Coordination Between Parent BH and Child" 3GPP TSG RAN WG1 Meeting #94bis, R1-1810675, Oct. 12, 2018 (Oct. 12, 2018), 10 pages, sections 2-4.

Nokia, et al., "Resource Allocation/Coordination Between Parent BH and Child links", 3GPP Tsg Ran WG1 Meeting #95, R1-1812702, 3rd Generation Partnership Project, Mobile Competence Centre, 650, Route Des Lucioles, F-06921, Sophia-Antipolis Cedex, France, Nov. 12, 2018-Nov. 16, 2018, Nov. 11, 2018, XP051554661, 11 Pages, pp. 2-4. 2.2, Figure 2, IAB resource types p. 5. 2.3 Resource pool coordination, section "2.2, Resources Types 6-9, section "2.3, Resource pool coordination, Figure 2, section "5 Conclusions", incl Proposals 6-8, Observations 1-5.

Supplementary European Search Report—EP19938345—Search Authority—The Hague—dated Mar. 20, 2023.

* cited by examiner

| Slot type index / Link | 1 | 2 | 3 | 4 | 5 | 6 | 7 | 8 | 9 |
|---|---|---|---|---|---|---|---|---|---|
| DL Parent BH | Rx | Rx | Rx | | | | | | |
| UL Parent BH | Tx | | | Tx | Tx | | | | |
| DL Child BH | | Tx | | | | Tx | Tx | | |
| UL Child BH | | | | Rx | | Rx | | Rx | |
| DL Access | | | Tx | | | | | Tx | Tx |
| UL Access | | | | | Rx | | Rx | | Rx |

FIG. 6A

| | Reception link | Transmission link |
|---|---|---|
| 1 | DL Parent BH | UL Parent BH |
| 2 | DL Parent BH | DL Child BH |
| 3 | DL Parent BH | DL Access |
| 4 | UL Child BH | UL Parent BH |
| 5 | UL Access | UL Parent BH |
| 6 | UL Child BH | DL Child BH |
| 7 | UL Access | DL Child BH |
| 8 | UL Child BH | DL Access |
| 9 | UL Access | DL Access |

FIG. 6B

FULL-DUPLEX SLOT CONFIGURATION

CROSS REFERENCE TO RELATED APPLICATION

This Application hereby claims priority to PCT Application No. PCT/CN2019/097033, which was filed on Jul. 22, 2019, is assigned to the assignee hereof, and hereby is expressly incorporated by reference herein in its entirety as if fully set forth below and for all applicable purposes.

FIELD OF THE DISCLOSURE

Aspects of the present disclosure relate to wireless communications, and more particularly, to techniques for full-duplex slot configuration in integrated access and backhaul (IAB) systems.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communication in integrated access and backhaul systems.

Certain aspects provide an apparatus for wireless communications. The apparatus includes a processing system configured to determine one or more traffic parameters associated with data configured for communication via wireless links including at least one reception link and at least one transmission link, select a full-duplex (FD) slot type for communication of the data via the wireless links, wherein the selection of the FD slot type is based on the one or more traffic parameters, and communicate the data with one or more wireless nodes via the wireless links in accordance with the selected FD slot type.

Certain aspects provide a method for wireless communications. The method generally includes determining one or more traffic parameters associated with data configured for communication via wireless links including at least one reception link and at least one transmission link, selecting a full-duplex (FD) slot type for communication of the data via the wireless links, wherein the FD slot type is based on the one or more traffic parameters, and communicating the data with one or more wireless nodes via the wireless links in accordance with the selected FD slot type.

Certain aspects provide an apparatus for wireless communications. The apparatus includes means for determining one or more traffic parameters associated with data configured for communication via wireless links including at least one reception link and at least one transmission link, means for selecting a full-duplex (FD) slot type for communication of the data via the wireless links, wherein the FD slot type is based on the one or more traffic parameters, and means for communicating the data with one or more wireless nodes via the wireless links in accordance with the selected FD slot type.

Certain aspects provide a computer-readable medium having codes for wireless communications, said codes being executable to determine one or more traffic parameters associated with data configured for communication via wireless links including at least one reception link and at least one transmission link, select a full-duplex (FD) slot type for communication of the data via the wireless links, wherein the FD slot type is based on the one or more traffic parameters, and communicate the data with one or more wireless nodes via the wireless links in accordance with the selected FD slot type.

Certain aspects provide an access point, including at least one antenna, and a processing system configured to determine one or more traffic parameters associated with data configured for communication via wireless links including at least one reception link and at least one transmission link, select a full-duplex (FD) slot type for communication of the data via the wireless links, wherein the FD slot type is based on the one or more traffic parameters, and communicate, via the at least one antenna and the wireless links, the data with one or more wireless nodes in accordance with the selected FD slot type.

To the accomplishment of the foregoing and related ends, the one or more aspects including the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 6A is a first table illustrating an example full-duplex slot type index for full-duplex communication from the perspective of an IAB node of FIG. 3, in accordance with certain aspects of the present disclosure.

FIG. 6B is a second table illustrating a list of reception link types and transmission link types associated with each slot type, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
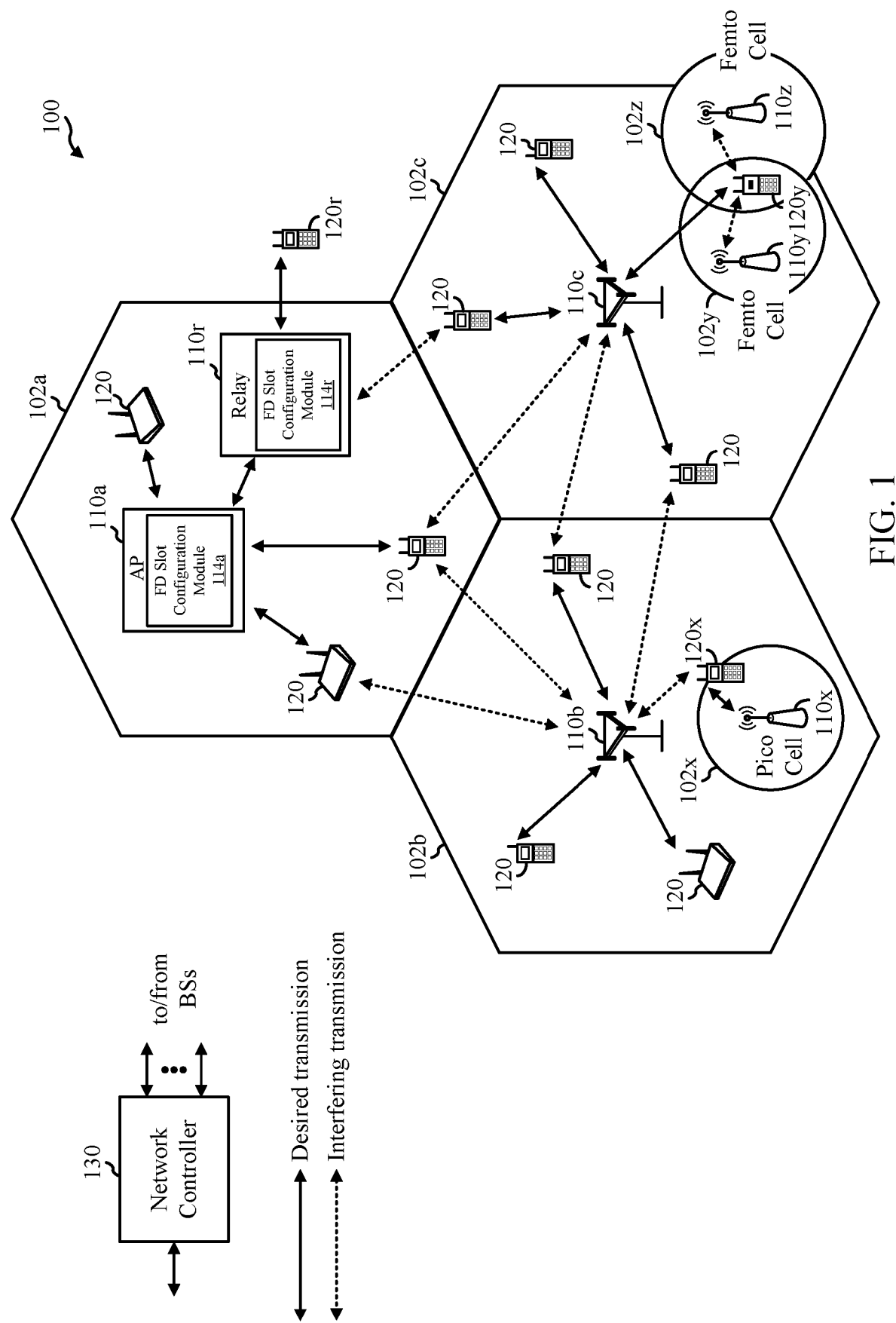
FIG. 1 is a block diagram conceptually illustrating an example telecommunications system, in accordance with certain aspects of the present disclosure.

Aspects of the present disclosure provide apparatus, methods, processing systems, and computer readable mediums for full-duplex slot configuration for integrated access and backhaul (IAB) communication systems. Specifically, the disclosure provides techniques for full-duplex communication in IAB systems, including modification, by IAB nodes, of slots and patterns of slots to full-duplex slot types and/or non-full duplex slot types. Accordingly, IAB systems are able to obtain improved channel capacity and flexible scheduling opportunities at each link to accommodate for backhaul and access traffic variances, and benefits both in eMBB and ultra-reliable low-latency communication (URLLC) services.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), an IAB node (e.g., an IAB donor node, an IAB parent node, and an IAB child node), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem (such as an AR/VR console and headset). Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Example Wireless Communications System

FIG. 1 illustrates an example wireless communication network 100 in which aspects of the present disclosure may be performed. For example, the wireless communication network 100 may be a New Radio (NR) or 5G network. For example, as shown in FIG. 1, an access point (AP) 110a includes a full-duplex (FD) configuration module 114a that may be configured for full-duplex slot configuration in integrated access and backhaul (IAB) communication systems, according to aspects described herein. In another example, a relay 110r also includes a full-duplex (FD) configuration module 114r configured for full-duplex slot configuration in integrated access and backhaul (IAB) communication systems. In certain aspects, the AP 110a may be an IAB donor and/or parent node, while the relay 110r is an IAB node that is a child node to the AP 110a. Accordingly, in some configurations, communications between the AP 110a and relay 110r may be facilitated by wireless backhaul link. Moreover, in some configurations, communications between the relay 110r and a user equipment 120r may be facilitated by a wireless access link.

As illustrated in FIG. 1, the wireless communication network 100 may include a number of access points (APs) 110 and other network entities. An AP may be a station that communicates with user equipment (UEs). Each AP 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR AP, 5G NB, or transmission reception point (TRP) may be interchangeable. In some examples, a cell may not necessarily be stationary, and the geographic area of the cell may move according to the location of a mobile AP. In some examples, the access points may be interconnected to one another and/or to one or more other access points or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

An AP may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). An AP for a macro cell may be referred to as a macro AP. An AP for a pico cell may be referred to as a pico AP. An AP for a femto cell may be referred to as a femto AP or a home AP. In the example shown in FIG. 1, the APs 110a, 110b and 110c may be macro APs for the macro cells 102a, 102b and 102c, respectively. The AP 110x may be a pico AP for a pico cell 102x. The APs 110y and 110z may be femto APs for the femto cells 102y and 102z, respectively. An AP may support one or multiple (e.g., three) cells.

Wireless communication network 100 may also include relay stations. A relay station is a station that receives a transmission of data and/or other information from an upstream station (e.g., an AP or a UE) and sends a transmission of the data and/or other information to a downstream station (e.g., a UE or an AP). A relay station may also be a UE that relays transmissions for other UEs. In the example shown in FIG. 1, a relay station 110r may communicate with the AP 110a and a UE 120r in order to facilitate communication between the AP 110a and the UE 120r. A relay station may also be referred to as an IAB node, a relay AP, a relay, etc.

Wireless communication network 100 may be a heterogeneous network that includes APs of different types, e.g., macro AP, pico AP, femto AP, relays, etc. These different types of APs may have different transmit power levels, different coverage areas, and different impact on interference in the wireless communication network 100. For example, macro AP may have a high transmit power level (e.g., 20 Watts) whereas pico AP, femto AP, and relays may have a lower transmit power level (e.g., 1 Watt).

Wireless communication network 100 may support synchronous or asynchronous operation. For synchronous operation, the APs may have similar frame timing, and transmissions from different APs may be approximately aligned in time. For asynchronous operation, the APs may have different frame timing, and transmissions from different APs may not be aligned in time. The techniques described herein may be used for both synchronous and asynchronous operation.

A network controller 130 may couple to a set of APs and provide coordination and control for these APs. The network controller 130 may communicate with the APs 110 via a backhaul. The APs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with an AP, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., an AP) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Access points are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving AP, which is an AP designated to serve the UE on the downlink and/or uplink. A finely dashed line with double arrows indicates interfering transmissions between a UE and an AP.

Figure 2:
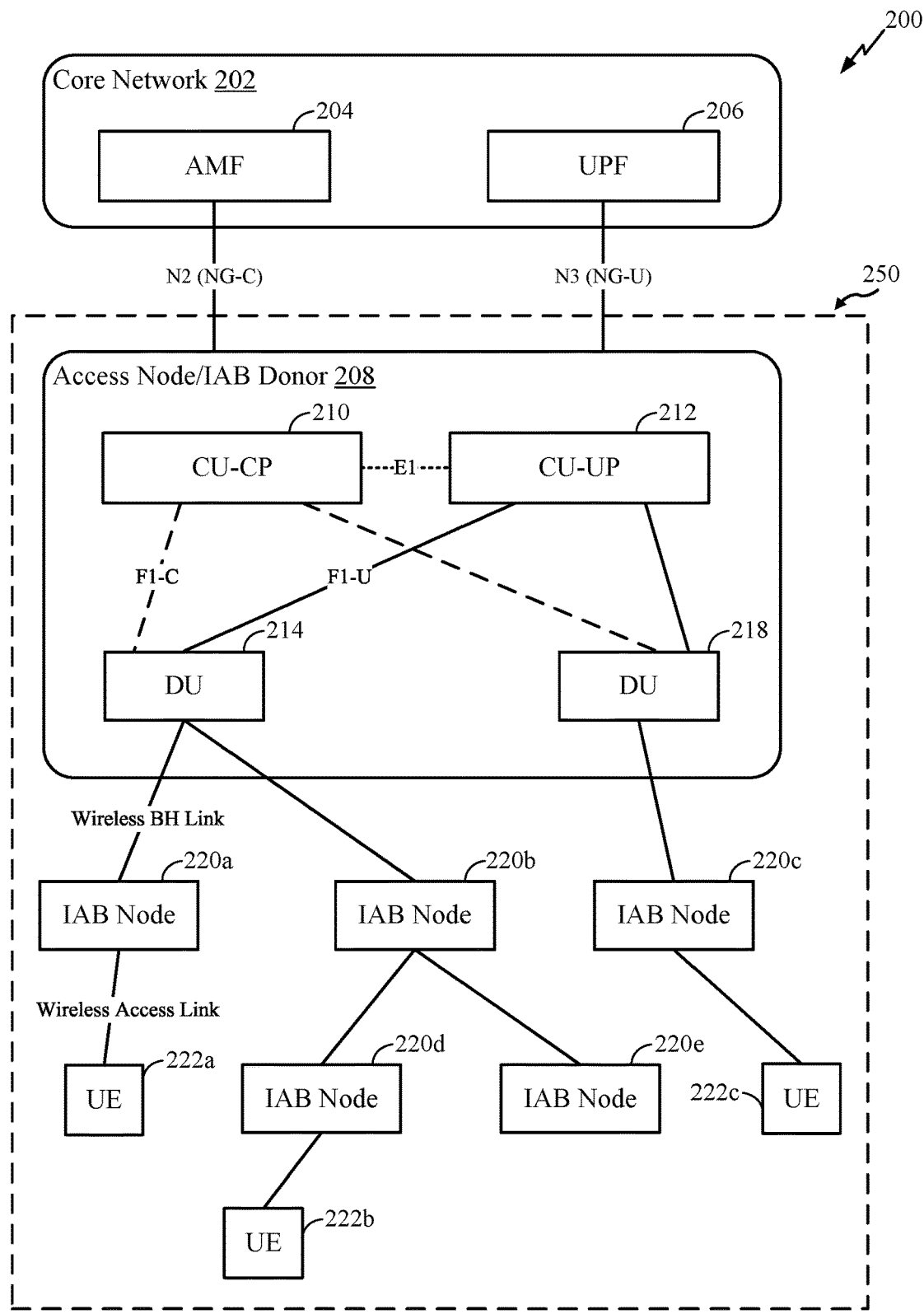
FIG. 2 is a block diagram conceptually illustrating an example architecture of a distributed radio access network (RAN) that includes an example integrated access and backhaul (IAB) network, which may be implemented in the telecommunications system of FIG. 1, in accordance with certain aspects of the present disclosure.

FIG. 2 illustrates an example architecture of a distributed radio access network (RAN) 200 that includes an example IAB network 250, which may be implemented in the wireless communication network 100 illustrated in FIG. 1. As shown in FIG. 2, the distributed RAN includes core network (CN) 202 and access node (AN) configured as an IAB donor 208.

As shown, the IAB network 250 includes an IAB donor node 208. The IAB donor node 208 is a RAN node (e.g., access point/gNB that terminates the NR Ng interface with the core network (e.g., next generation NG core)) and is generally connected to the core network via a wireline backhaul link. The CN 202 may host core network functions. CN 202 may be centrally deployed. CN 202 functionality may be offloaded (e.g., to advanced wireless services (AWS)), in an effort to handle peak capacity. The CN 202 may include the access and mobility management function (AMF) 204 and user plane function (UPF) 206. The AMF 204 and UPF 206 may perform one or more of the core network functions.

The IAB donor 208 may communicate with the CN 202 (e.g., via a backhaul interface). The IAB donor 208 may communicate with the AMF 204 via an N2 (e.g., NG-C) interface. The IAB donor 208 may communicate with the UPF 206 via an N3 (e.g., NG-U) interface. The IAB donor 208 may include a central unit-control plane (CU-CP) 210, one or more central unit-user plane (CU-UPs) 212, one or more distributed units (DUs) 214-218, and one or more antenna/remote radio units (AU/RRUs) (not shown). The CUs and DUs may also be referred to as gNB-CU and gNB-DU, respectively.

An IAB donor node 208 may also be referred to as an IAB anchor node and may include an IAB central unit (e.g., NR CU) or an IAB Distributed Unit (e.g., NR DU). The IAB network 250 further includes one or more non-donor IAB nodes (e.g., 220a-220e). Each IAB node (including donor and non-donor IAB nodes) may serve one or more UEs (e.g., 222a-222c) connected to an IAB node. As shown, the IAB nodes, including the donor IAB node 208, may be connected via wireless backhaul links (e.g., NR wireless backhaul links or backup NR wireless backhaul links). Each IAB node connects to its served UEs via respective access links.

Each IAB node is a RAN node (e.g., access point/gNB) that provides IAB functionality with two roles including data unit function (DU-F) and a mobile termination function (MT-F). The DU-F of an IAB node is generally responsible for scheduling UEs (e.g., served by the IAB node) and other IAB nodes (e.g., that are connected as child nodes to the IAB node). The DU-F also controls both access and backhaul links under its coverage. The MT-F of an IAB node is controlled and scheduled by an IAB donor node or another IAB node as its parent IAB node. In an aspect, the IAB donor node 208 only includes DU-F and no MT-F.

The CU-CP 210 may be connected to one or more of the DUs 214-218. The CU-CP 210 and DUs 214-218 may be connected via a wireline interface using F1-C protocols. As shown in FIG. 2, the CU-CP 210 may be connected to multiple DUs, but the DUs may be connected to only one CU-CP. Although FIG. 2 only illustrates one CU-UP 212, the IAB donor 208 may include multiple CU-UPs. The CU-CP 210 selects the appropriate CU-UP(s) for requested services (e.g., for a UE). The CU-UP(s) 212 may be connected to the CU-CP 210. For example, the CU-UP(s) 212 and the CU-CP 210 may be connected via an E1 interface. The CU-CP(s) 212 may be connected to one or more of the DUs 214, 218. The CU-UP(s) 212 and DUs 214, 218 may be connected via a F1-U interface. As shown in FIG. 2, the CU-CP 210 may be connected to multiple CU-UPs, but the CU-UPs may be connected to only one CU-CP.

A DU, such as DUs 214 and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214, 218 may be connected with one of AU/RRUs.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, IAB donor 208 may support dual connectivity with NR and may share a common fronthaul for LTE and NR. The distributed RAN 200 may enable cooperation between and among DUs 214, 218, for example, via the CU-CP 212. An inter-DU interface may not be used.

Logical functions may be dynamically distributed in the distributed RAN 200. As will be described in more detail with reference to FIG. 4, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
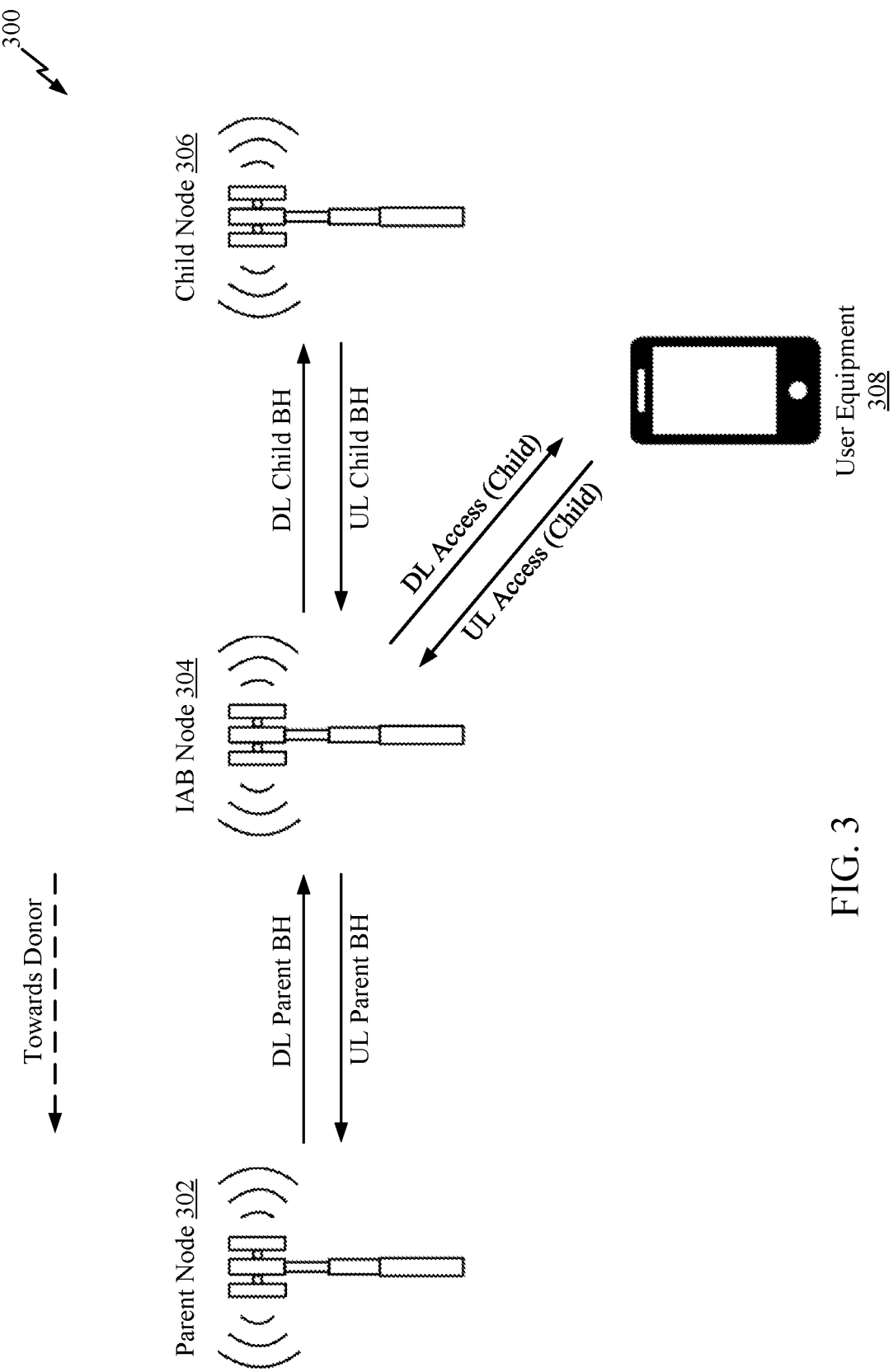
FIG. 3 is a block diagram illustrating an example IAB network, in accordance with certain aspects of the present disclosure.

FIG. 3 illustrates an example IAB network 300 in which aspects of the present disclosure may be practiced. In this example, the IAB network 300 includes a parent node 302, an IAB node 304, a child node 306, and a user equipment (UE) 308. The terms "parent node" and "child node" are terms assigned to a node dependent on that node's position from the donor node relative to another node. For example, as shown in FIG. 3, the parent node 302 is closer to a donor node (not shown) than the IAB node 304 or the child node 306. Accordingly, the IAB node 304 is a child node relative to the parent node 302, and a parent node relative to the child node 306.

In this example, the IAB node 304 includes six types of links: a DL parent backhaul (BH) and an UL parent BH with its parent node 302, a DL child BH and an UL child BH with its child node 306, and a DL access and an UL access with the UE 308.

Figure 4:
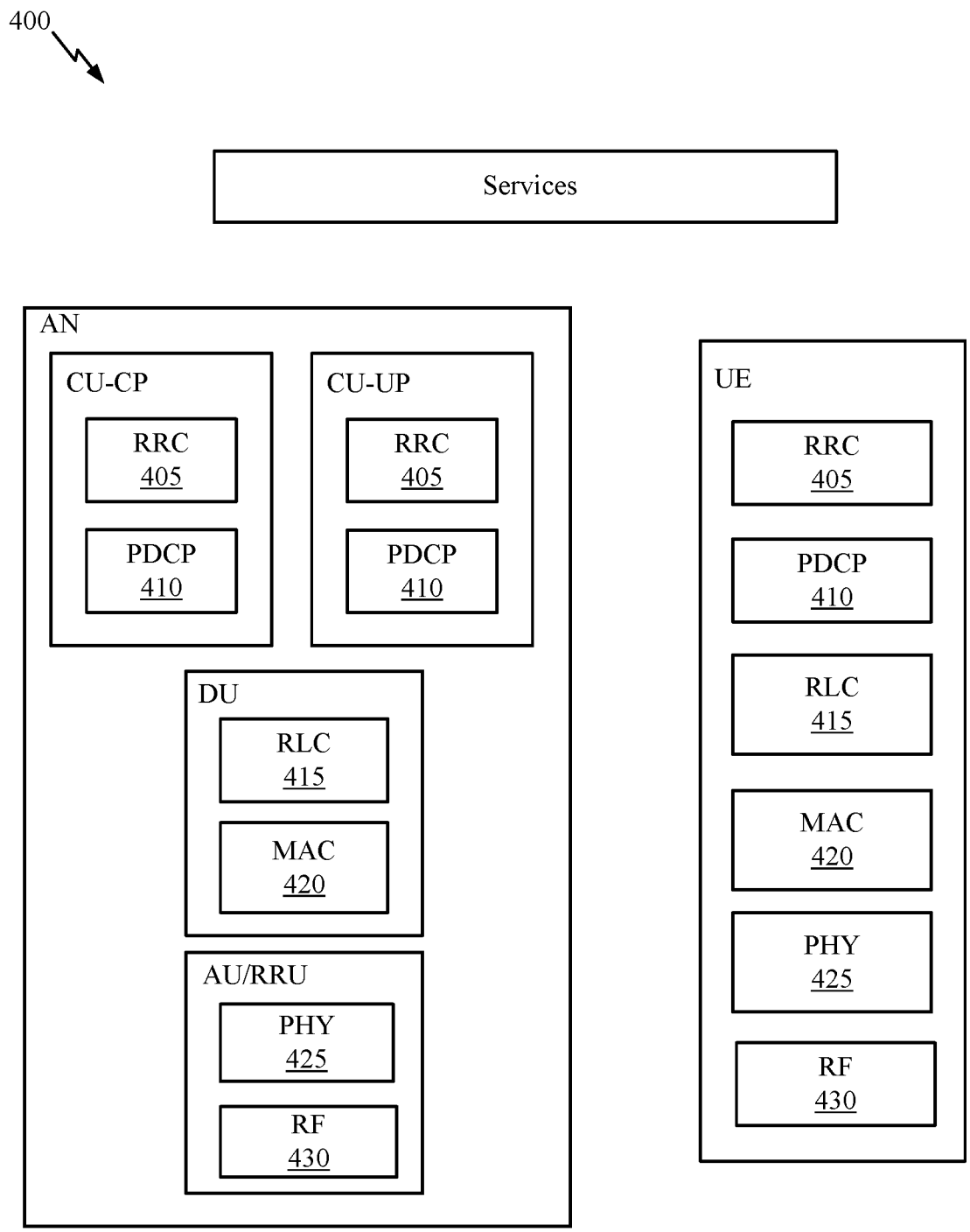
FIG. 4 is a block diagram illustrating an example communications protocol stack in a RAN, in accordance with certain aspects of the present disclosure.

FIG. 4 illustrates a diagram showing examples for implementing a communications protocol stack 400 in a RAN (e.g., such as the RAN 200), according to aspects of the present disclosure. The illustrated communications protocol stack 400 may be implemented by devices operating in a wireless communication system, such as a 5G NR system (e.g., the wireless communication network 100). In various examples, the layers of the protocol stack 400 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 4, the system may support various services over one or more protocols. One or more protocol layers of the protocol stack 400 may be implemented by an AN (e.g., AN 208 in FIG. 2, or AP 110a in FIG. 1) and/or the UE (e.g., UE 120).

As shown in FIG. 4, the protocol stack 400 is split in the AN. The RRC layer 405, PDCP layer 410, RLC layer 415, MAC layer 420, PHY layer 425, and RF layer 430 may be implemented by the AN. For example, the CU-CP (e.g., CU-CP 210 in FIG. 2) and the CU-UP e.g., CU-UP 212 in FIG. 2) each may implement the RRC layer 405 and the PDCP layer 410. A DU (e.g., DUs 214 and 218 in FIG. 2) may implement the RLC layer 415 and the MAC layer 420. However, the DU may also implement the PHY layer(s) 425 and the RF layer(s) 430 via an AU/RRU connected to the DU. The PHY layers 425 may include a high PHY layer and a low PHY layer.

The UE (e.g., UE 222a-222c) may implement the entire protocol stack 400 (e.g., the RRC layer 405, the PDCP layer 410, the RLC layer 415, the MAC layer 420, the PHY layer(s) 425, and the RF layer(s) 430).

Figure 5:
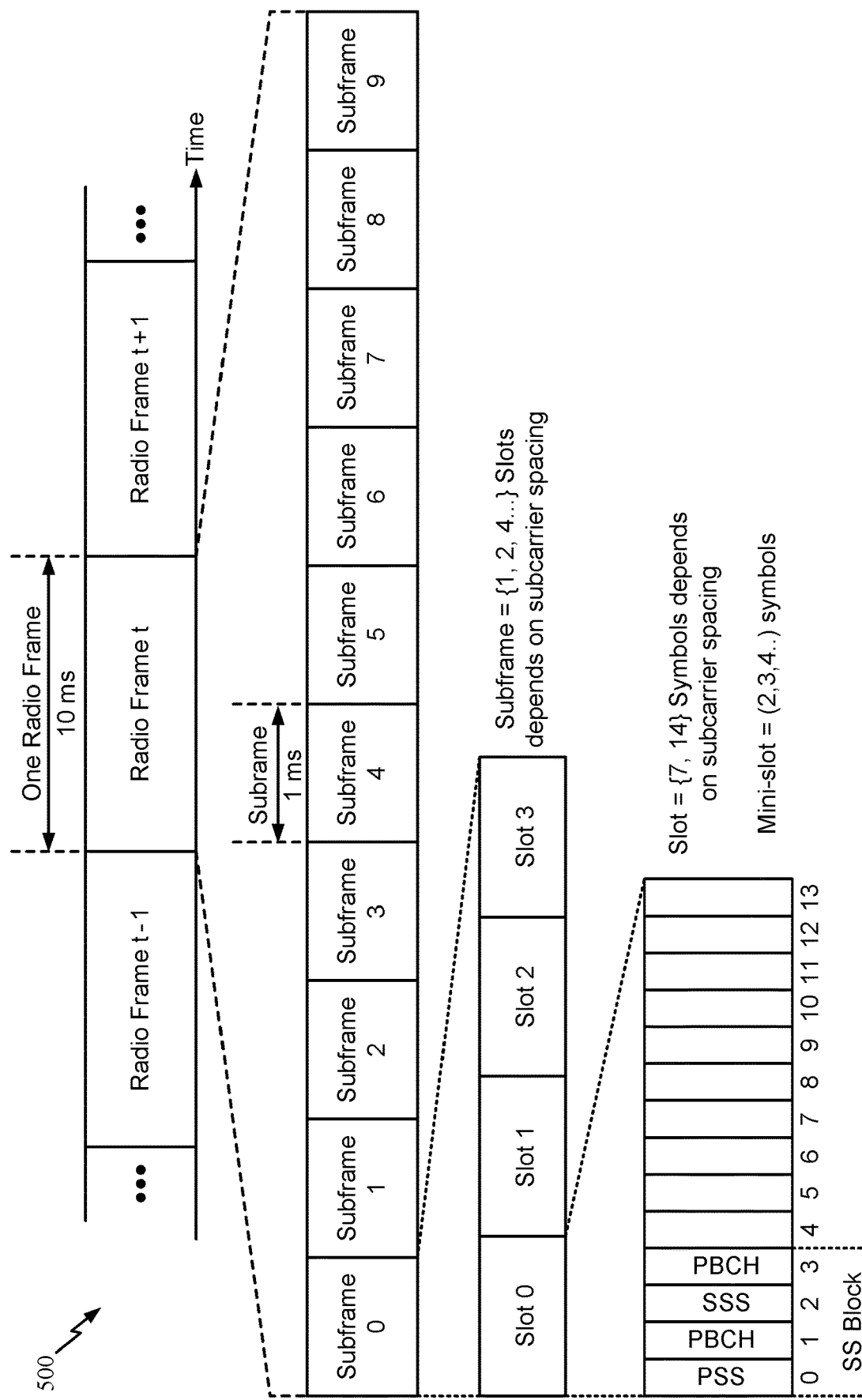
FIG. 5 is a block diagram is a diagram illustrating an example of a frame format for new radio (NR), in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or AP), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Full-Duplex Integrated Access and Backhaul (IAB) System

Next generation (5G) wireless networks are expected to provide ultra-high data rate and support wide scope of application scenarios. Wireless full-duplex (FD) communications are an emerging technique theoretically capable of doubling wireless link capacity. The main idea behind wireless full-duplex is to enable radio network nodes to transmit and receive simultaneously using the same time resources at the same time slot. This contrasts with conventional half duplex operation where transmission and reception differ in time.

In an IAB system without full-duplex, an IAB node (e.g., IAB node 304) cannot perform transmission and reception of wireless data concurrently. For example, from the perspective of IAB node 304, any reception link (e.g., DL parent BH, UL child BH, and/or UL access) and any transmission link (e.g., UL parent BH, DL child BH, and/or DL access) cannot have data communicated at the same time. Moreover, non-full-duplex communication reduces the IAB systems ability to accommodate the requirements of urgent data traffic (e.g., ultra-reliable low-latency communication (URLLC) data traffic). For example, the half-duplex mode restricts the radio resource spectrum efficiency and hence lowers down the system throughput.

As described above, some data may be characterized as URLLC data. In some configurations, URLLC data refers to data that has a relatively low or ultra-low latency requirement. For example, the latency requirement of URLLC data may be lower than the latency requirement of other data included in a subframe. Generally, latency refers to the delay associated with receipt of data at its intended destination. In some configurations, URLLC data refers to data that has a relatively high priority requirement. For example, the priority requirement of URLLC data may be higher than the priority requirement of other data included in the subframe. Generally, priority refers to the importance or time-sensitivity of the data. Data having relatively higher importance and/or relatively greater time-sensitivity should be received before other data having relatively lesser importance and/or relatively lesser time-sensitivity. In some configurations, URLLC data refers to data that has a relatively high reliability requirement. For example, the reliability requirement of URLLC data may be greater than the reliability requirement of other data included in that subframe. Generally, reliability refers to how consistently data is successfully received by the intended destination without errors. As used throughout the disclosure, a quality of service (QoS) may correspond to any one or more of a latency, priority, or reliability requirement.

Therefore, the disclosure describes techniques for utilizing full-duplex to enable concurrent transmission and reception at an IAB node to support dynamic traffic allocation, improved system capacity, and capability to fast deliver any-directional packet. For example, to enable efficient IAB system operation, a plurality of full-duplex slot types are defined. Based on the full-duplex slots, the nodes in an IAB system can determine the proper full-duplex slot configuration to adapt with the traffic status variance of all related links of an IAB node, and send signaling to other nodes for synchronization.

Example Full-Duplex Slot Types

In certain aspects, an IAB node (or IAB donor) determines whether to use a full-duplex slot or a non-full-duplex slot (e.g., a half-duplex downlink or uplink slot) to communicate wireless data. The determination to use a full-duplex slot or a non-full-duplex slot may be based on traffic parameters associated with the wireless data. For example, the wireless data being communicated by the IAB node may include enhanced mobile broadband (eMBB) data that requires a high data transmission rate and/or a high data reliability requirement. In another example, the wireless data being communicated by the IAB node may include URLLC data having an ultra-reliable and ultra-low latency requirement. In yet another example, the wireless data being communicated by the IAB node may include both eMBB data and URLLC data. Thus, in an example where a first link is communicating eMBB data, and a second link is communicating URLLC data at the same time, the IAB node may determine to use a full-duplex slot that communicates the eMBB data of the first link and the URLLC data of the second link using the same time resources. Accordingly, in this example, the IAB node may select a type of full-duplex slot on the basis of which links are communicating the eMBB and URLLC data, and on the basis of other traffic parameters (e.g., the data transmission rate of the eMBB data, and the latency and reliability requirements of the URLLC data).

FIG. 6A illustrates a first table showing an example full-duplex slot type index for full-duplex communication from the perspective of IAB node 304. In this example, each column represents one slot type. In each slot type, two or three links are involved in the full duplex. It should be noted that additional or fewer slot types may be available for other nodes (e.g., a parent/donor node, or a child node) depending on the links available to those nodes.

In the example shown in FIG. 6A, the first table includes eleven full-duplex slot types. The first slot type is a slot for full-duplex communication of data received over a DL parent BH link and data transmitted over an UL parent BH link. The second slot type is a slot for full-duplex communication of data received over a DL parent BH link and data transmitted over a DL child BH link. The third slot type is a slot for full-duplex communication of data received over a DL parent BH link and data transmitted over a DL access link. The fourth slot type is a slot for full-duplex communication of data transmitted over an UL parent BH link and data received over an UL child BH link. The fifth slot type is a slot for full-duplex communication of data transmitted over an UL parent BH link and data received over an UL access link. The sixth slot type is a slot for full-duplex communication of data transmitted over a DL child BH link and data received over an UL child BH link. The seventh slot type is a slot for full-duplex communication of data transmitted over a DL child BH link and data received over an UL access link. The eighth slot type is a slot for full-duplex communication of data received over an UL child BH link and data transmitted over a DL access link. The ninth slot type is a slot for full-duplex communication of data transmitted over a DL access link and data received over an UL access link. The tenth slot type is a slot for full-duplex communication of data received over a DL parent BH link and data transmitted over a DL child BH link and a DL access link. The eleventh slot type is a slot for full-duplex communication of data transmitted over an UL parent BH link and data received over an UL child BH link and an UL access link.

In the example of the tenth slot type, data received over the DL parent BH link is paired with data transmitted over the DL child BH link and the DL access link in the same time-frequency resource. For example, the data transmitted over the DL child BH link and the DL access link can be multiplexed in different frequency subbands (FDM) or different spatial domains (SDM). In the example of the eleventh slot type, data transmitted over the UL parent BH link is paired with and data received over the UL child BH link and the UL access link in the same time-frequency resource. For example, the UL child BH link and the UL access link can be multiplexed in different frequency subbands (FDM) or different spatial domains (SDM).

FIG. 6B illustrates a second table showing a list of reception link types and transmission link types associated with each slot type. It should be noted that additional or fewer slot types may be available for other nodes (e.g., a parent/donor node, or a child node) depending on the links available to those nodes.

Thus, in one example, if a first link is communicating eMBB data, and a second link is communicating URLLC data at the same time, the IAB node will determine to use a full-duplex slot. Then the IAB node will select a full-duplex slot based on the links communicating the eMBB and URLLC data. For example, if the first link is an UL parent BH link and the second link is an UL child BH link, then the IAB node will select the fourth slot type for full-duplex communication of the eMBB and URLLC data. Accordingly, determination by an IAB node to utilize a full-duplex slot and selection of the particular type of full-duplex slot may be based on, or a function of, one or more traffic parameters. As used herein, the term "traffic parameters" may relate to one or more requirements associated with different service categories with the introduction of a Services Based Architecture (SBA) and Control and User Plane Separation (CUPS), requirements of data being communicated over one or more links (e.g., latency, reliability, priority, data rate, etc.), a status of one or more of the links (e.g., amount of traffic on a link, traffic throughput, link bandwidth, etc.), and/or a variance of one or more traffic parameters over time or the status of the links.

It should be noted that the length of the slot can be a full slot, or a partial slot (e.g., a mini-slot) as shown in FIG. 5.

Example Full-Duplex Slot Patterns

In a full-duplex mode of communication, an IAB node (or IAB donor) may utilize a full-duplex slot pattern for communication of data between various other nodes. In one example, the full-duplex slot pattern may include a plurality of consecutive slots, each of which is one of a non-full-duplex slot or one of the plurality of full-duplex slot types. In some configurations, the IAB node can periodically apply the pattern to communicate data, and repeat the pattern at intervals. In other configurations, the IAB node can apply the pattern aperiodically (e.g., the pattern occurs only after triggered by a certain event, (e.g. link throughput change or urgent traffic occurrence)).

In some configurations, the IAB node (or IAB donor) determines an initial periodic full-duplex slot pattern containing one or more full-duplex slot types and, in some cases, one or more non-full-duplex slots. For example, the IAB node may initially determine a full-duplex slot pattern based on the traffic characteristics of all links. For example, the IAB node may monitor data traffic over all the links it communicates over. Monitoring may include tracking a status of each link (e.g., amount of traffic on each link, link bandwidth, one or more QoS parameters, etc.) to determine whether to implement a full-duplex slot pattern. If the IAB node determines to implement a full-duplex slot pattern, the IAB node will generate a full-duplex slot pattern including an arrangement of each slot type in the pattern to accommodate the determined status of one or more links. For example, the IAB node may determine a pattern configured to adjust a ratio of aggregated capacity of each link of a slot of a particular type in accordance with a ratio of the traffic amount on each link of that slot. For example, the throughput of two or three links in one full-duplex slot type may be summed in their individual capacity aggregations, respectively. In one example, if for one link (e.g., DL parent BH), the ratio of aggregated capacity is smaller than the ratio of the traffic amount, the percentage of FD slot types that include the this link (e.g., the first slot type, the second slot type, the third slot type, and the tenth slot type) in the slot pattern are increased. In other words, the number of FD slots in the pattern that are a first, second, third, or tenth slot type will increase. Conversely, if the ratio of aggregated capacity is larger than the ratio of the traffic amount, the percentage of the FD slot types involving the link in the slot pattern is decreased.

Moreover, the IAB node may adjust the full-duplex slot pattern based on continued monitoring of the status of the links. For example, when the IAB node detects a change of link status (e.g., a change in one or more traffic parameters), the IAB node will adjust a periodic slot pattern that includes the full-duplex slot types described above and in relation to FIG. 6A, or apply an aperiodic full-duplex slot pattern or single slot modification according to the variation. For example, if the data communicated over the two or three links using a particular full-duplex slot type is larger than or equal to a threshold amount (e.g., the aggregated amount of data on each link exceeds one common threshold, or the data amount of one or more links exceeds an individual threshold of that corresponding link), then the IAB node may determine to increase a frequency of use of a particular full-duplex slot type for the two or three links in order to accommodate particular traffic needs. Similarly, if the data communicated over the two or three links using a particular full-duplex slot type is smaller than or equal to a threshold amount (e.g., the aggregated amount of data on each link is smaller one common threshold, or the data amount of one or more links is smaller than an individual threshold of that corresponding link), then the IAB node may determine to decrease a frequency of use of a particular slot type for the two or three links.

Example Processes for Full-Duplex Slot Type Modification

Figure 7:
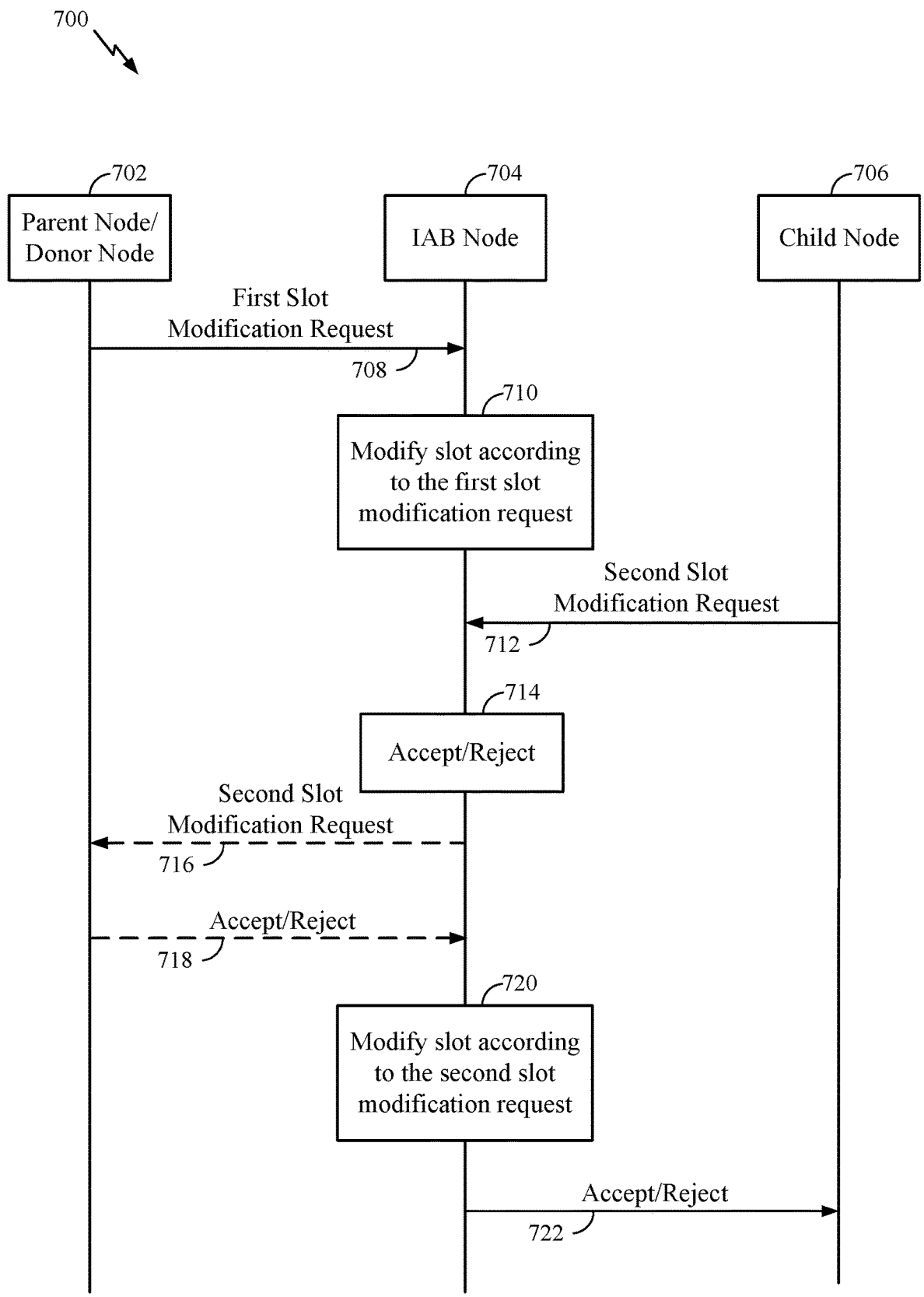
FIG. 7 is a call flow diagram illustrating example communication processes for modifying one or more slots types, in accordance with certain aspects of the present disclosure.

FIG. 7 is a call flow diagram 700 illustrating example communication processes for modifying one or more slots types. In certain aspects, modifying the one or more slot types includes modifying a full-duplex slot to a non-full-duplex slot, changing a non-full-duplex slot to one of the plurality of full-duplex slot types, or changing a particular type of full-duplex slot to another type of full-duplex slot in a periodic or aperiodic pattern determined by the IAB node, or for modifying any particular slot not in a pattern. FIG. 7 includes a parent node 702 (e.g., parent node 302) or a donor node, an IAB node 704 (e.g., IAB node 304) which is a child node relative to the parent node 702, and a child node 706 (e.g., child node 306). The IAB node 704 can modify a slot to accommodate traffic parameters of one or more links and/or data requirements of data communicated over the links.

It should be noted that by modifying an IAB system for full-duplex communication and providing periodic/aperiodic slot type modification, the IAB system is able to realize an increase in channel capacity and flexible scheduling to accommodate different types of data being communicated, as well as variance in amounts of traffic. Accordingly, the systems and methods of the disclosure benefit both eMBB and URLLC services.

In certain aspects, the modification of a slot type by the IAB node 704 may be triggered by either the parent node 702, the child node 706, or the IAB node 704 itself. In one example, the parent node 702 may send a request message 708 configured to request that the IAB node 704 to initiate a modification of a slot. When the IAB node 704 receives the message, the IAB node 704 may determine which slot to modify and how to modify the slot based on the request, then modify the slot 710 according to the request.

In another example, the child node 706 may send a request message 712 to the IAB node 704 requesting to modify a slot type, which in this case a parent node relative to the child node 706, to initiate a modification of a slot. When the IAB node 704 receives the message, the IAB node 704 may determine whether to accept or reject the request 714, and may modify the slot according to the modification request 720 if accepted. The IAB node 704 determines whether to accept or reject the request 714 based on the traffic parameters of the links that are involved in the slot that the child node 706 wants to modify. In one example, if the links of a current slot type have a high traffic amount (e.g., eMBB data) or a high priority and/or high reliability (e.g., URLLC data) data traffic compared to the links of the requested slot type, the IAB node 704 may determine to reject the request 714. However, if the links of the requested slot type have a higher amount of traffic and/or higher priority data than the links of the current slot type, then the IAB node 704 may determine to accept the request 714.

The IAB node 704 may then transmit an accept/reject message 722 to the child node 706. Optionally, the IAB node 704, upon accepting the request, may forward the request message 716 to a parent node 702 or donor node for acceptance. The parent node 702 may accept/reject the modification request and transmit the acceptance/rejection 718 to the IAB node 704 in response to the modification request 716. Once the IAB 704 node receives the acceptance/rejection 718, the IAB node 704 may proceed to modify the slot according to the modification request 720, and forward the acceptance/rejection 722 to the child node 706. In some examples, the IAB node 704 and/or the parent node 702 may reject the request to modify a slot based on traffic parameters that the child node is unaware of It should be noted that in some examples, the IAB node 704 may determine the modification of the slot and executes the modification by itself, without notification or requesting an acceptance or a rejection.

In a first specific example, the IAB node 704 may determine to modify a slot. In this example, the determination to modify the slot may be based on monitoring, by the IAB node 704, one or more traffic parameters associated with the DL Child BH link and/or the UL Child BH link. Based on the monitoring, the IAB node 704 may determine a slot type modification for the DL Child BH link and/or the UL Child BH link based on the traffic parameters (e.g., a variance of an amount of traffic on a link). For example, the IAB node 704 may select the seventh slot type and change the slot type to the seventh slot type for full-duplex communication if the DL child BH link and the UL access link have a high amount of traffic and/or URLLC data. Accordingly, the data communicated over the DL child BH link and the UL access link will be paired for full-duplex communication in the seventh slot type. In another example, the IAB node 704 may select the eighth slot type and change the slot type to the eighth slot type for full-duplex communication if the UL child BH link and the DL access link have high amount of traffic and/or URLLC data. Accordingly, the data communicated over the UL child BH link and the DL access link will be paired for full-duplex communication in the eighth slot type. In another example, the IAB node 704 may select the sixth the slot type and change the slot type to the sixth slot type for full duplex communication if the DL child BH and the UL child BH have high amount of traffic and/or URLLC data. Accordingly, the data communicated over the DL child BH and the UL child BH will be paired for full-duplex communication in the sixth slot type. The IAB node 704 may then notify the child node 706 of the modification to the slot.

In a second specific example, IAB node 704 may determine to modify a slot based on traffic parameters of one or more links. Similar to the previous example, the determination to modify the slot may be based on monitoring one or more traffic parameters of at least the DL parent BH link and/or the UL parent BH link. The IAB node 704 may then request the slot modification from the parent node 702 based on the traffic parameters. For example, the IAB node 704 may select one of a second slot type, a third slot type, or a tenth slot type and request to modify the slot accordingly if the DL parent BH link and the DL child BH link and/or DL access link have a high amount of traffic and/or URLLC data. Accordingly, if the parent node 702 accepts the requested modification, then data communicated over the DL parent BH link and one or more of the DL child BH link or DL access link will be paired for full-duplex communication. In another example, the IAB node 704 may request to modify the slot type to the fourth slot type, the fifth slot type, or the eleventh slot type if the UL Parent BH link and one or more of the UL Child BH link or the UL Access link have a high amount of traffic and/or URLLC data. Accordingly, if the parent node 702 accepts the requested modification, then data communicated over the UL Parent BH link and one or more of the UL Child BH link or the UL Access link will be paired for full-duplex communication. In another example, the IAB node 704 may request to modify the slot type to the first slot type if the DL Parent BH link and the UL Parent BH link have a high amount of traffic and/or URLLC data. Accordingly, if the parent node 702 accepts the requested modification, then data communicated over the DL Parent BH link and the UL Parent BH link will be paired for full-duplex communication.

In a third specific example, child node 706 may determine to modify a slot based on traffic parameters of one or more links. The child node 706 may then request the slot modification from the IAB node 704. The IAB node 704 will determine whether to accept or reject the request, and send a response to the child node 706 indicating the acceptance or rejection. For example, the child node 706 may determine to modify a slot based on traffic parameters monitored over the DL child BH link or the UL child BH link. In one example, the child node 706 may request to modify a slot to the second slot type, the seventh slot type, or the tenth slot type if the DL child BH link has a high amount of traffic and/or URLLC data. In another example, the child node 706 may request to modify the slot to the fourth slot type, the eighth slot type, or the eleventh slot type if the UL child BH link has a high amount of traffic and/or URLLC data. In another example, the child node 706 may request to modify the slot to the sixth slot type if the DL child BH link and the UL child BH link have a high amount of traffic and/or URLLC data.

In a fourth specific example, the child node 706 may determine to modify a slot based on traffic parameters of one or more links. The child node 706 may then request the slot modification from the IAB node 704. The IAB node 704 may then send the request for the slot modification to the parent node 702. The parent node 702 then determines whether to accept to reject the request, and proceeds to communicate a response message to the IAB node 704 indicating the acceptance or rejection. The IAB node 704 may then communicate a response to the child node 706 indicating the acceptance or rejection of the parent node 702. For example, the child node 706 may determine to modify the slot based on traffic parameters of at least the DL child BH link and/or the UL child BH link, and communicate a request for the slot modification to the IAB node 704. Upon receiving the request, the IAB node 704 may determine whether to accept or reject the request modification based on traffic parameters of at least the DL parent BH link and/or the UL parent BH link. The IAB node 704 may then pass the requested slot modification to the parent node 702, depending on traffic parameters of at least the DL parent BH link and/or the UL parent BH link. For example, the child node 706 and the IAB node 704 may request to modify the slot to the second slot type or the tenth slot type if the DL parent BH link and/or the DL child BH link have a high amount of traffic and/or URLLC data. In another example, the child node 706 and the IAB node 704 may request to modify the slot to the fourth slot type or the eleventh sloth type if the UL parent BH link and the UL child BH link have a high amount of traffic and/or URLLC data.

In a fifth specific example, the parent node 702 may determine to modify a slot based on traffic parameters of one or more links. Once a determination has been made, the parent node 702 notifies the IAB node 704 with a message requesting that the IAB node 704 modify the slot according to the determination. For example, the determination by the parent node 702 may be based on monitoring the traffic parameters of the DL parent BH link and/or the UL parent BH links. In one example, the parent node 702 may request to modify the slot to the second slot type, the third lot type, or the tenth slot type if the DL parent BH link has a high amount of traffic and/or URLLC data. In another example, the parent node 702 may request to modify the slot to the fourth slot type, the fifth slot type, or the eleventh slot type if the UL parent BH link has a high amount of traffic and/or URLLC data. In another example, the parent node 702 may request to modify the slot to the first slot type if the DL parent BH link and/or the UL parent BH link have a high amount of traffic and/or URLLC data.

In a sixth specific example, the parent node 702 determines the modification of a slot based on traffic parameters of one or more links. Once a determination has been made, the parent node 702 notifies the IAB node 704 with a message requesting that the IAB node 704 modify the slot according to the determination. Once the IAB node 704 receives the request message, the IAB node 704 determines the modification of the slot and notifies the child node 706 with a message requesting that the child node 706 modify the slot according to the parent node 702 determination. For example, the determination by the parent node 702 may be based on monitoring the traffic parameters of the DL parent BH link or the UL parent BH link. In one example, determination by the IAB node 704 to modify the slot is based on monitoring the traffic parameters of at least the DL child BH and/or the UL child BH link. In another example, the determined slot modification includes modifying the slot to the second slot type or the tenth slot type if the DL parent BH and DL child BH have a high amount of traffic and/or URLLC data. In another example, the determined slot modification includes modifying the slot to the fourth slot type or the eleventh slot type if the UL parent BH link and/or the UL child BH link have a high amount of traffic and/or URLLC data.

In a seventh specific example, the IAB node 704 determines the modification of the slot and executes the modification by itself. For example, the IAB node 704 may determine to modify the slot based on traffic parameters determined by monitoring the DL access link and/or the UL access link. In one example, the determined slot modification includes modifying the slot to the ninth slot type if one or more of the DL access link and/or the UL access link have a high amount of traffic and/or URLLC data.

Figure 8:
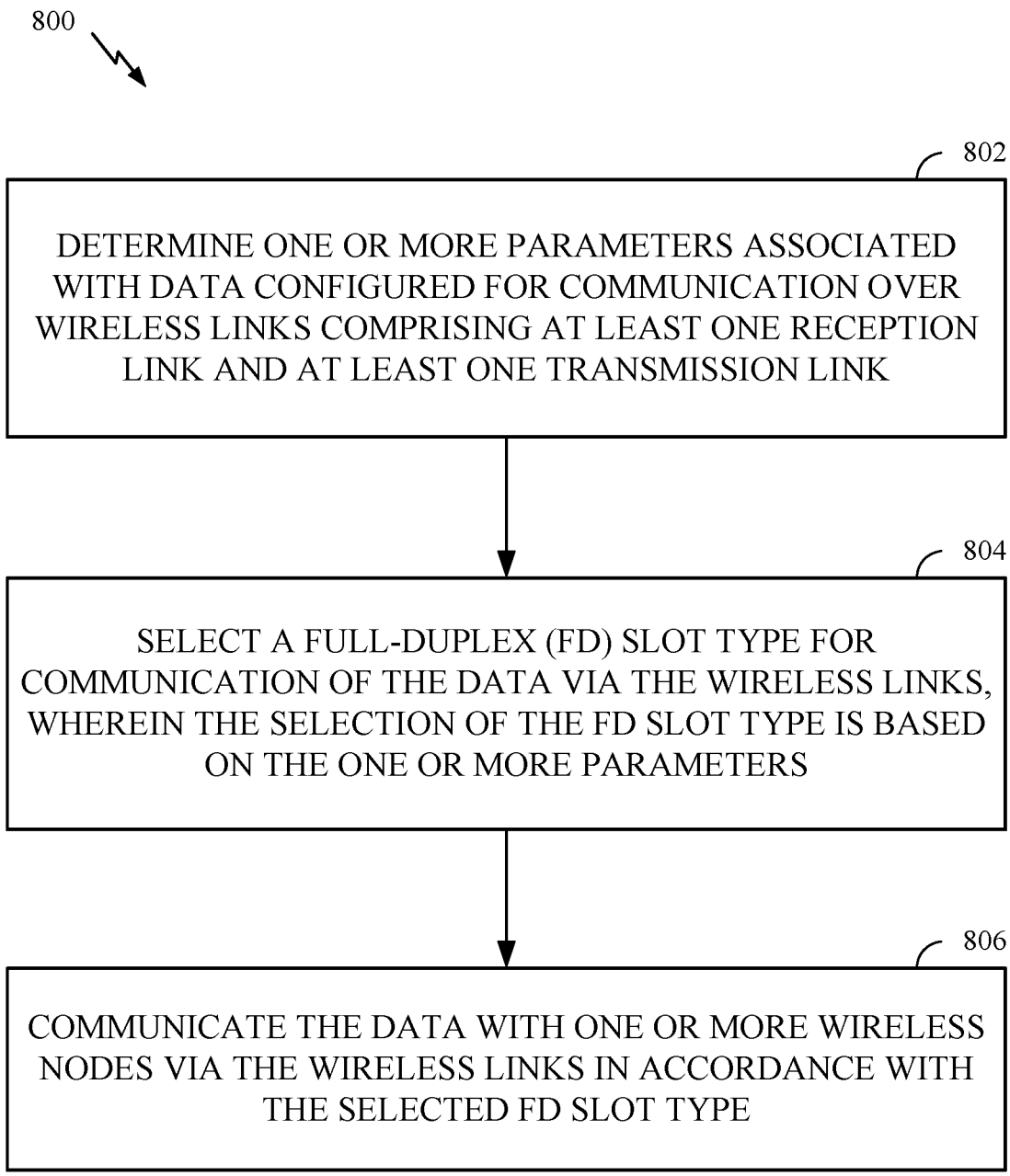
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by a AP (e.g., such as a AP 110 in the wireless communication network 100, and any one or more of the parent node 702, the IAB node 704, or the child node 706 of FIG. 7). Operations 800 may be implemented as software components that are executed and run on one or more processors (e.g., processor 904 and processor 1040 in relation to FIGS. 9 and 10 described below). Further, the transmission and reception of signals by the AP in operations 800 may be enabled, for example, by one or more antennas (e.g., antenna 910 and antennas 1034a-1024t in relation to FIGS. 9 and 10). In certain aspects, the transmission and/or reception of signals by the AP may be implemented via a bus interface (e.g., bus 906 in relation to FIG. 9) of the one or more processors obtaining and/or outputting signals.

The operations 800 may begin, at a first block 802, by determining one or more parameters associated with data configured for communication over wireless links comprising at least one reception link and at least one transmission link.

The operations 800 proceed to a second block 804, by selecting a full-duplex (FD) slot type for communication of the data over the wireless links, wherein the FD slot type is based on the one or more parameters.

The operations 800 proceed to a third block 806, by communicating the data with one or more wireless nodes via the wireless links in accordance with the selected FD slot type.

In certain aspects, the operations include selecting the FD slot type from a plurality of FD slot types, wherein each of the plurality of FD slot types corresponds to a slot configured to communicate the data over the reception and transmission links. In some configurations, the plurality of FD slot types include a first slot associated with a first link paired with a second link and a third link. In some configurations, the first slot is configured to communicate data of the first link paired with data of the second link and data of the third link using a first time-frequency resource, and the wireless links comprise first, second and third links. In certain aspects, the first link is a downlink reception link, and the second link and the third link are downlink transmission links, or the first link is an uplink transmission link, and the second link and the third link are uplink reception links. In certain aspects, the second link and the third link are multiplexed in different frequency subbands or in different spatial domains.

In certain aspects, the plurality of FD slot types include a first slot associated with a first link paired with a second link, the first slot is configured to communicate data of the first link paired with data of the second link using a first time-frequency resource, and the wireless links comprise first and second links.

In certain aspects, the operations 800 include determining a slot pattern comprising a plurality of slots, wherein the plurality of slots are associated with at least one FD slot type or non-FD slot type, and communicating the data via the wireless links in accordance with the determined slot pattern. In certain aspects, the at least one FD slot type comprises the selected FD slot type. In certain aspects, the determination of the slot pattern is based on the one or more parameters associated with the data configured for communication via the wireless links. In certain aspects, the operations 800 include detecting a change in the one or more parameters, and modifying the determined slot pattern based on the change in the one or more parameters.

Figure 9:
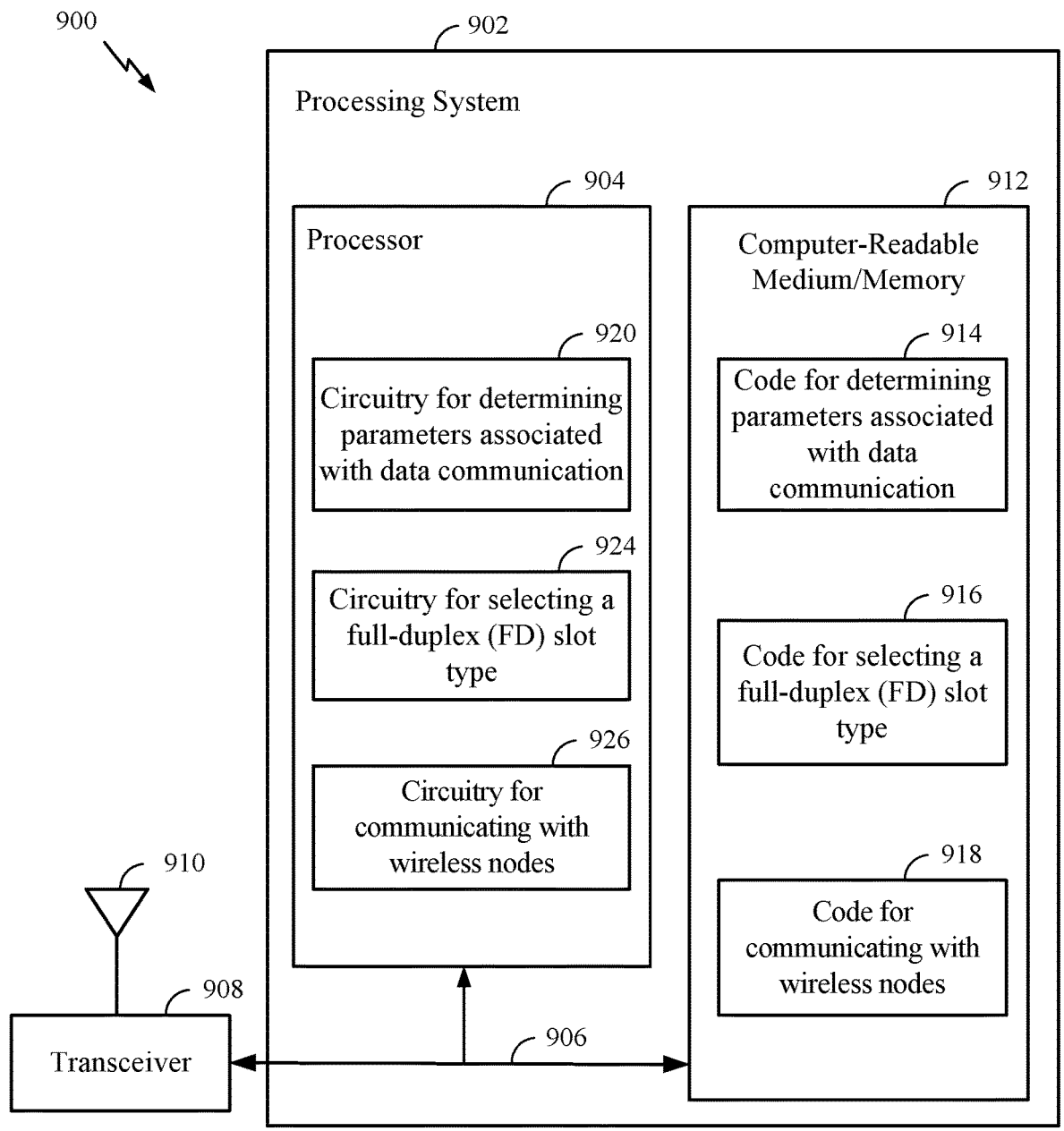
FIG. 9 is a block diagram illustrating a communications device that may include various components (e.g., corresponding to means-plus-function components) configured to perform operations for the techniques disclosed herein, such as the operations illustrated in FIG. 8.

FIG. 9 illustrates a communications device 900 that may include various components (e.g., corresponding to means-plus-function components) configured to perform operations for the techniques disclosed herein, such as the operations illustrated in FIG. 8. In some examples, the communications device 900 may correspond to an AP 110a or a relay 110r of FIG. 1. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 8, or other operations for performing the various techniques discussed herein for FD communication and FD slot selection. In certain aspects, computer-readable medium/memory 912 stores code for determining parameters associated with data communication 914. In certain aspects, computer-readable medium/memory 912 stores code for selecting an FD slot type 916. In certain aspects, computer-readable medium/memory 912 stores code for communicating with wireless nodes 918.

In certain aspects, the processor 904 has circuitry configured to implement the code stored in the computer-readable medium/memory 912. For example, the processor 904 includes circuitry for determining parameters associated with data communication 920. In certain aspects, the processor 904 includes circuitry for selecting a full-duplex (FD) slot type 924. In certain aspects, the processor 904 includes circuitry for communicating with wireless nodes 926.

Figure 10:
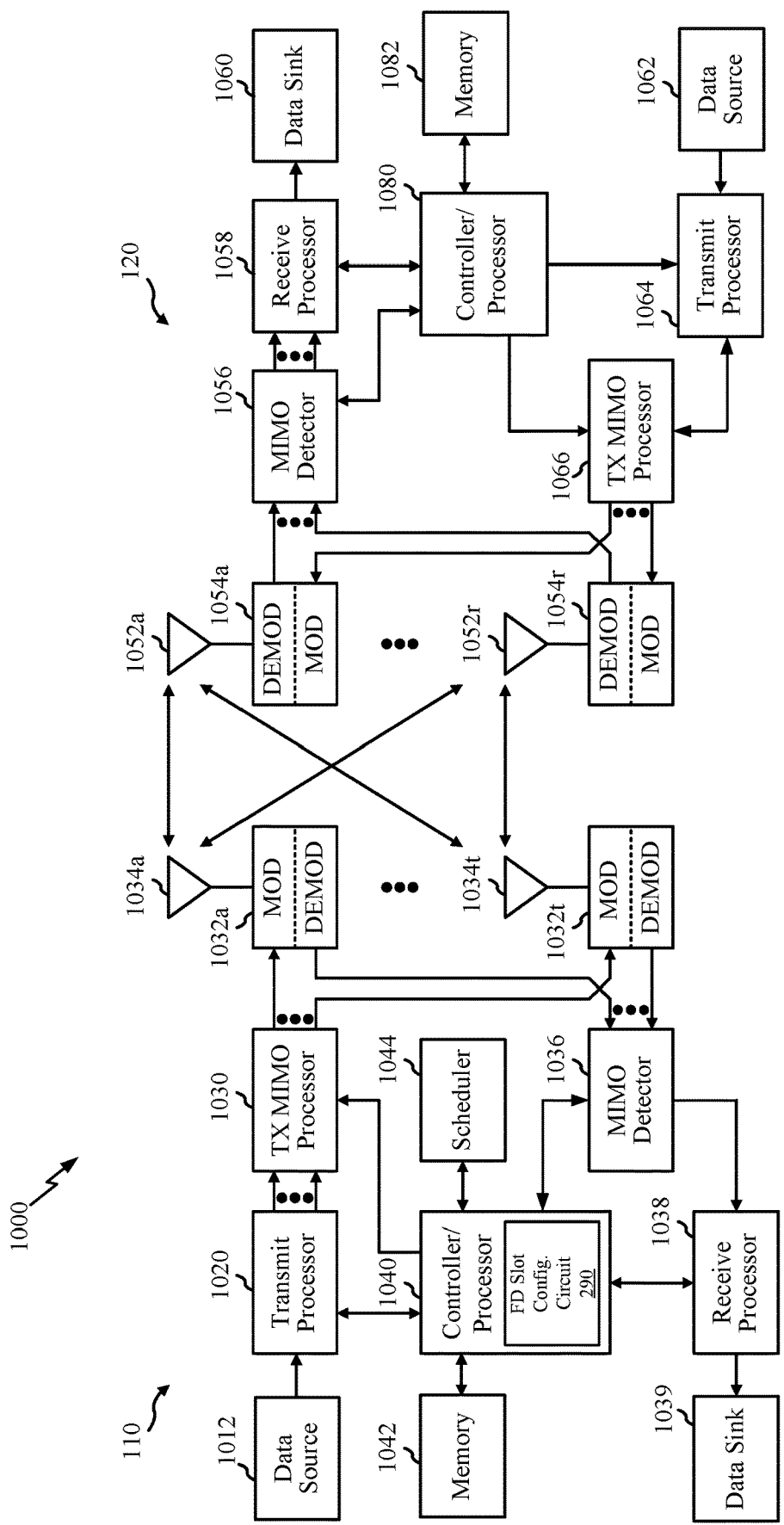
FIG. 10 illustrates example components of a base station and a user equipment, which may be used to implement aspects of the present disclosure, in accordance with certain aspects of the present disclosure.

FIG. 10 illustrates example components 1000 of AP 110 and UE 120 (as depicted in FIG. 1), which may be used to implement aspects of the present disclosure. For example, antennas 1052, processors 1066, 1058, 1064, and/or controller/processor 1080 of the UE 120 and/or antennas 1034, processors 1020, 1030, 1038, and/or controller/processor 1040 of the AP 110 may be used to perform the various techniques and methods described herein. For example, as shown in FIG. 10, the processor 1040 includes an full-duplex (FD) slot configuration circuit 290 that may be configured for full-duplex slot configuration in integrated access and backhaul (IAB) communication systems, according to aspects described herein. In certain aspects, the full-duplex slot communication circuit 290 enables the processor 1040 to detect a change in the one or more traffic parameters, and dynamically modify a slot pattern based on the change in the one or more traffic parameters. In certain aspects, the AP 110 may be an IAB donor and/or parent node, or an IAB child node.

At the AP 110, a transmit processor 1020 may receive data from a data source 1012 and control information from a controller/processor 1040. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 1020 may process (e.g., encode and symbol map) the data and control information to obtain data symbols and control symbols, respectively. The processor 1020 may also generate reference symbols, e.g., for the primary synchronization signal (PSS), secondary synchronization signal (SSS), and cell-specific reference signal (CRS). A transmit (TX) multiple-input multiple-output (MIMO) processor 1030 may perform spatial processing (e.g., precoding) on the data symbols, the control symbols, and/or the reference symbols, if applicable, and may provide output symbol streams to the modulators (MODs) 1032a through 1032t. Each modulator 1032 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 1032a through 1032t may be transmitted via the antennas 1034a through 1034t, respectively.

At the UE 120, the antennas 1052a through 1052r may receive the downlink signals from the access point 110 and may provide received signals to the demodulators (DE-MODs) in transceivers 1054a through 1054r, respectively. Each demodulator 1054 may condition (e.g., filter, amplify, downconvert, and digitize) a respective received signal to obtain input samples. Each demodulator may further process the input samples (e.g., for OFDM, etc.) to obtain received symbols. A MIMO detector 1056 may obtain received symbols from all the demodulators in transceivers 1054a through 1054r, perform MIMO detection on the received symbols if applicable, and provide detected symbols. A receive processor 1058 may process (e.g., demodulate, deinterleave, and decode) the detected symbols, provide decoded data for the UE 120 to a data sink 1060, and provide decoded control information to a controller/processor 1080.

On the uplink, at UE 120, a transmit processor 1064 may receive and process data (e.g., for the physical uplink shared channel (PUSCH)) from a data source 1062 and control information (e.g., for the physical uplink control channel (PUCCH) from the controller/processor 1080. The transmit processor 1064 may also generate reference symbols for a reference signal (e.g., for the sounding reference signal (SRS)). The symbols from the transmit processor 1064 may be precoded by a TX MIMO processor 1066 if applicable, further processed by the demodulators in transceivers 1054a through 1054r (e.g., for SC-FDM, etc.), and transmitted to the access point 110. At the AP 110, the uplink signals from the UE 120 may be received by the antennas 1034, processed by the modulators 1032, detected by a MIMO detector 1036 if applicable, and further processed by a receive processor 1038 to obtain decoded data and control information sent by the UE 120. The receive processor 1038 may provide the decoded data to a data sink 1039 and the decoded control information to the controller/processor 1040.

The controllers/processors 1040 and 1080 may direct the operation at the AP 110 and the UE 120, respectively. The processor 1040 and/or other processors and modules at the AP 110 may perform or direct the execution of processes for the techniques described herein. The memories 1042 and 1082 may store data and program codes for AP 110 and UE 120, respectively. A scheduler 1044 may schedule UEs for data transmission on the downlink and/or uplink.

Additional Considerations

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Means for receiving or means for obtaining may include a receiver (such as the receive processor 1038) or an antenna(s) 1034 of the access point 110 or the receive processor 1058 or antenna(s) 1052 of the station 120 illustrated in FIG. 10. Means for transmitting or means for outputting may include a transmitter (such as the transmit processor 1020) or an antenna(s) 1034 of the access point 110 or the transmit processor 1064 or antenna(s) 1052 of the station 120 illustrated in FIG. 10. Means for associating, means for determining, means for monitoring, means for deciding, means for providing, means for detecting, means for performing, and/or means for setting may include a processing system, which may include one or more processors, such as the receive processor 1038/1058, the transmit processor 1020/1064, the TX MIMO processor 1030/1066, or the controller 1040/1080 of the access point 110 and station 120 illustrated in FIG. 10.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims

What is claimed is:

1. An apparatus for wireless communications, comprising:
an integrated access and backhaul (IAB) node comprising a processing system configured to:
determine one or more traffic parameters associated with data configured for communication via wireless links comprising a plurality of reception links and a plurality of transmission links, wherein the plurality of reception links comprise a downlink backhaul link with a parent TAB node of the TAB node, an uplink backhaul link with a child TAB node of the TAB node, and an uplink access link with a user equipment (UE), and wherein the plurality of transmission links comprise an uplink backhaul link with the parent TAB node, a downlink backhaul link with the child TAB node, and a downlink access link with the UE;

select a full-duplex (FD) slot type from a plurality of FD slot types comprising a parent backhaul link slot type, a child backhaul link slot type, and an access link slot type for communication of the data via the wireless links, wherein the selection of the FD slot type from the plurality of FD slot types is based on the one or more traffic parameters;

determine an initial slot pattern including a number of slots based on the one or more traffic parameters, wherein each slot is associated with the selected FD slot type or a non-FD slot type;

determine a modified slot pattern by modifying one or more slots of the number of slots associated with at least the selected FD slot type based on a change in the one or more traffic parameters; and communicate the data with one or more wireless nodes via the wireless links in accordance with the determined modified slot pattern.

2. The apparatus of claim 1, wherein each of the plurality of FD slot types corresponds to a slot configured to communicate the data via at least one of the plurality of reception links and at least one of the plurality of transmission links.

3. The apparatus of claim 2, wherein:
the plurality of FD slot types include a first slot associated with a first link paired with a second link and a third link;
the first slot is configured to communicate data of the first link paired with data of the second link and data of the third link using a first time-frequency resource; and
the wireless links comprise the first link, the second link, and the third link.

4. The apparatus of claim 3, wherein:
the first link is a downlink reception link, and the second link and the third link are downlink transmission links, or
the first link is an uplink transmission link, and the second link and the third link are uplink reception links.

5. The apparatus of claim 3, wherein the second link and the third link are multiplexed in different frequency subbands or in different spatial domains.

6. The apparatus of claim 2, wherein:
the plurality of FD slot types include a first slot associated with a first link paired with a second link;
the first slot is configured to communicate data of the first link paired with data of the second link using a first time-frequency resource; and
the wireless links comprise the first link and the second link.

7. The apparatus of claim 1, wherein modifying the one or more slots comprises modifying association of the one or more slots from the selected FD slot type to another FD slot type of the plurality of FD slot types.

8. The apparatus of claim 1, wherein modifying the one or more slots comprises modifying association of the one or more slots from the selected FD slot type to the non-FD slot type.

9. The apparatus of claim 1, wherein the non-FD slot type corresponds to a half-duplex slot type or an uplink slot type.

10. The apparatus of claim 1, wherein the processing system is further configured to:
detect the change in the one or more traffic parameters; and
modify the determined initial slot pattern based on the change in the one or more traffic parameters.

11. The apparatus of claim 1, wherein each of the one or more wireless nodes comprises the parent IAB node, the child IAB node, or the UE.

12. The apparatus of claim 11, wherein each of the plurality of FD slot types is associated with a slot configured to communicate:
downlink data or uplink data via at least one of the plurality of reception links, and
downlink data or uplink data via at least one of the plurality of transmission links.

13. The apparatus of claim 1, wherein the one or more traffic parameters comprise at least one of:
a requirement associated with the data configured for communication via the wireless links;
a bandwidth of one of the wireless links; or
a throughput of one of the wireless links.

14. The apparatus of claim 13, wherein the requirement associated with the data comprises one or more of a latency requirement, a reliability requirement, or a priority requirement.

15. The apparatus of claim 1, wherein the processing system is further configured to receive a request, from at least one of a parent node or a child node of the one or more wireless nodes, to modify a first slot of the number of slots.

16. The apparatus of claim 15, wherein the processing system is further configured to:
modify the first slot from being associated with a first FD slot type of the plurality of FD slot types to being associated with a second FD slot type of the plurality of FD slot types;
modify the first slot from being associated with the first FD slot type to being associated with the non-FD slot type; or
modify the first slot from being associated with the non-FD slot type to being associated with the first FD slot type.

17. The apparatus of claim 15, wherein if the request to modify the first slot is received from the parent node, the processing system is further configured to modify the first slot according to the request.

18. The apparatus of claim 15, wherein if the request to modify the first slot is received from the child node, the processing system is further configured to:
determine whether to accept or reject the request based on the one or more traffic parameters associated with data configured for communication via the first slot; and
provide an indication of acceptance or rejection for transmission to the child node.

19. A method for wireless communications by an integrated access and backhaul (IAB) node, comprising:
determining one or more traffic parameters associated with data configured for communication via wireless links comprising a plurality of reception links and a plurality of transmission links, wherein the plurality of reception links comprise a downlink backhaul link with a parent IAB node of the IAB node, an uplink backhaul link with a child IAB node of the IAB node, and an uplink access link with a user equipment (UE), and wherein the plurality of transmission links comprise an uplink backhaul link with the parent IAB node, a downlink backhaul link with the child IAB node, and a downlink access link with the UE;
selecting a full-duplex (FD) slot type from a plurality of FD slot types comprising a parent backhaul link slot type, a child backhaul link slot type, and an access link slot type for communication of the data via the wireless links, wherein the selection of the FD slot type from the plurality of FD slot types is based on the one or more traffic parameters;

determining an initial slot pattern including a number of slots based on the one or more traffic parameters, wherein each slot is associated with the selected FD slot type or a non-FD slot type;

determining a modified slot pattern by modifying one or more slots of the number of slots associated with at least the selected FD slot type based on a change in the one or more traffic parameters; and communicating the data with one or more wireless nodes via the wireless links in accordance with the determined modified slot pattern.

20. The method of claim 19, wherein each of the plurality of FD slot types corresponds to a slot configured to communicate the data via at least one of the plurality of reception links and at least one of the plurality of transmission links.

21. The method of claim 20, wherein:
the plurality of FD slot types include a first slot associated with a first link paired with a second link and a third link;
the first slot is configured to communicate data of the first link paired with data of the second link and data of the third link using a first time-frequency resource; and
the wireless links comprise the first link, the second link, and the third link.

22. The method of claim 21, wherein:
the first link is a downlink reception link, and the second link and the third link are downlink transmission links; or the first link is an uplink transmission link, and the second link and the third link are uplink reception links; or the second link and the third link are multiplexed in different frequency subbands or in different spatial domains.

23. The method of claim 20, wherein:
the plurality of FD slot types include a first slot associated with a first link paired with a second link;
the first slot is configured to communicate data of the first link paired with data of the second link using a first time-frequency resource; and
the wireless links comprise the first link and the second link.

24. The method of claim 19, wherein the non-FD slot type corresponds to a half-duplex slot type or an uplink slot type.

25. The method of claim 19, wherein:
the method further comprises:
detecting the change in the one or more traffic parameters; and
modifying the determined initial slot pattern based on the change in the one or more traffic parameters.

26. The method of claim 19, further comprising receiving a request, from at least one of a parent node or a child node of the one or more wireless nodes, to modify a first slot of the number of slots.

27. The method of claim 26, further comprising:
modifying the first slot from being associated with a first FD slot type of the plurality of FD slot types to being associated with a second FD slot type of the plurality of FD slot types;
modifying the first slot from being associated with the first FD slot type to being associated with the non-FD slot type; or
modifying the first slot from being associated with the non-FD slot type to being associated with the first FD slot type.

28. The method of claim 26, wherein:
if the request to modify the first slot is received from the parent node, the first slot is modified according to the request; or
if the request to modify the first slot is received from the child node, the method further comprising:
determining whether to accept or reject the request based on the one or more traffic parameters associated with data configured for communication via the first slot; and
providing an indication of acceptance or rejection for transmission to the child node.

29. An integrated access and backhaul (IAB) node, comprising:
at least one antenna; and
a processing system configured to:
determine one or more traffic parameters associated with data configured for communication via wireless links comprising a plurality of reception links and a plurality of transmission links, wherein the plurality of reception links comprise a downlink backhaul link with a parent IAB node of the IAB node, an uplink backhaul link with a child IAB node of the IAB node, and an uplink access link with a user equipment (UE), and wherein the plurality of transmission links comprise an uplink backhaul link with the parent IAB node, a downlink backhaul link with the child IAB node, and a downlink access link with the UE; and
select a full-duplex (FD) slot type from a plurality of FD slot types comprising a parent backhaul link slot type, a child backhaul link slot type, and an access link slot type for communication of the data via the wireless links, wherein the selection of the FD slot type from the plurality of FD slot types is based on the one or more traffic parameters;
determine an initial slot pattern including a number of slots based on the one or more traffic parameters, wherein each slot is associated with the selected FD slot type or a non-FD slot type;
determine a modified slot pattern by modifying one or more slots of the number of slots associated with at least the selected FD slot type based on a change in the one or more traffic parameters; and
a transceiver configured to transmit and receive, via the at least one antenna and the wireless links, the data with one or more wireless nodes in accordance with the determined modified slot pattern.

* * * * *